(12) United States Patent
Adams et al.

(10) Patent No.: US 7,106,196 B2
(45) Date of Patent: Sep. 12, 2006

(54) METHOD AND APPARATUS FOR CONFIGURING THE READ-RANGE OF AN RFID LABEL OR TAG

(75) Inventors: Matthew Thomas Adams, Mason, OH (US); Douglas Adrian Taylor, Monroe, OH (US)

(73) Assignee: Intermec IP Corp, Everett, WA (US)

( * ) Notice: Subject to any disclaimer, the term of this patent is extended or adjusted under 35 U.S.C. 154(b) by 271 days.

(21) Appl. No.: 10/194,273

(22) Filed: Jul. 12, 2002
(Under 37 CFR 1.47)

(65) Prior Publication Data

US 2003/0156032 A1    Aug. 21, 2003

Related U.S. Application Data

(60) Provisional application No. 60/305,308, filed on Jul. 12, 2001.

(51) Int. Cl.
*G08B 13/14* (2006.01)
(52) U.S. Cl. ............................. 340/572.1; 340/572.4; 343/745
(58) Field of Classification Search .. 340/572.1–572.9; 343/745, 750, 841, 872
See application file for complete search history.

(56) References Cited

U.S. PATENT DOCUMENTS

| | | | | |
|---|---|---|---|---|
| 4,786,915 A * | 11/1988 | Cartwright et al. | ......... | 343/909 |
| 5,557,279 A * | 9/1996 | D'Hont | ........................ | 342/42 |
| 5,642,118 A * | 6/1997 | Grannemann | ................... | 342/4 |
| 5,767,789 A * | 6/1998 | Afzali-Ardakani et al. | | 340/10.1 |
| 5,850,181 A | 12/1998 | Heinrich et al. | ........... | 371/22.3 |
| 5,862,101 A * | 1/1999 | Haas et al. | .................. | 368/327 |
| 5,920,290 A * | 7/1999 | McDonough et al. | ....... | 343/873 |
| 5,939,984 A | 8/1999 | Brady et al. | ............. | 340/572.1 |
| 5,942,987 A | 8/1999 | Heinrich et al. | ........ | 340/825.54 |
| 5,972,156 A | 10/1999 | Brady et al. | ................ | 156/280 |
| 5,995,006 A | 11/1999 | Walsh | ..................... | 340/572.7 |
| 6,121,544 A * | 9/2000 | Petsinger | .................. | 174/35 R |
| 6,127,938 A * | 10/2000 | Friedman | ................. | 340/693.6 |
| 6,144,345 A * | 11/2000 | Kuether | ..................... | 343/834 |
| 6,359,588 B1 * | 3/2002 | Kuntzsch | ............. | 343/700 MS |
| 6,424,315 B1 * | 7/2002 | Glenn et al. | ................ | 343/895 |
| 6,624,752 B1 * | 9/2003 | Klitsgaard et al. | ....... | 340/572.1 |

FOREIGN PATENT DOCUMENTS

WO    WO 00/05674    2/2000

OTHER PUBLICATIONS

Tag-it—The New World of Smart Labels, Texas Instruments TIRIS News, Issue No. 18, p. 6 1998 (US).
Airline Industry Poised to Adopt Smart Labels for Baggage, Texas Instruments TIRIS News, Issue No. 19, pp. 1 and 3, 1999 (US).
Pilot Testing of Tag-it Parcel Shipping Company Shows Excellent Results, Texas Instruments TIRIS News, Issue No. 19, p. 3, 1999 (US).
TI Announces Two New Tag-it Products, Texas Instruments TIRIS News, Issue No. 20, p. 7, 2000 (US).

* cited by examiner

*Primary Examiner*—Phung T. Nguyen
(74) *Attorney, Agent, or Firm*—Orum & Roth LLC

(57) ABSTRACT

A RFID device with a surface treatment which interferes with the transmission of RF signals/data between the RFID device and the RF interrogator or reader. A surface treatment of either RF reflective or RF absorptive ink is deposited on a RFID device using an attenuation pattern to fine tune the read range of the RFID device thereby eliminating or reducing the occurrence of accidental or cross reads between nearby RF interrogators or readers.

The surface layer may be deposited at the time of printing the labels thereby fixing the attenuation at a known level or the surface treatment may be applied in an on-demand fashion allowing the attenuation level to be varied to an individual requirement.

21 Claims, 1 Drawing Sheet

METHOD AND APPARATUS FOR CONFIGURING THE READ-RANGE OF AN RFID LABEL OR TAG

This application claims the benefit of U.S. provisional application No. 60/305,308 filed Jul. 12, 2001.

FIELD OF THE INVENTION

The present invention generally relates to RFID labels and tags. Specifically, the present invention relates to controlled attenuation of the read range of an RFID label tags.

DESCRIPTION OF RELATED ART

RFID labels and tags are interrogated by a RF interrogator or reader. The RF interrogator or reader transmits a radio signal which is received by an RFID and is then reflected back to the reader/interrogator carrying the RFID's data content. The power used by the RF reader/interrogator is a factor in determining the range at which an RFID may be detected and/or interrogated. RF interrogator/reader power levels are subject to FCC regulations. Also, the power of the reader signal is limited by the antenna configuration selected and any shielding or interfering transmissions. Where multiple tags are present, within a read range, multiple reads may occur. Cross reads may occur between adjacent interrogators/readers. Physical barriers have been used to construct lanes through which RF labels pass one by one, for example parallel lanes each with its own reader/interrogator that is shielded from adjacent lanes. Shielding is expensive and difficult for the user to apply and if not applied correctly may result in lost or duplicate readings.

In many RFID applications shielding is impractical and/or undesirable. For example, where several printers with RFIDs are located adjacent to each other on a common table top it would be difficult to reliably interrogate only one of them if the read range of the RFID's used was large (for example, 18 inches or more).

To be economical, RFID transponders are generally engineered and bulk manufactured to satisfy the majority demand for RFID transponders, i.e. to have as large a read range with as low as a reader power as possible. Therefore, there is a need to quickly and economically attenuate the read range of RFID transponders on a group or individual basis, to satisfy special situations.

An object of the present invention is to provide an RFID label or tag with a fixable read range that does not require the use of external shielding.

SUMMARY OF THE INVENTION

An RFID device with a surface treatment which interferes with transmission of RF signals/data between the RFID device and the RF interrogator/reader. Different surface treatment embodiments may either absorb and/or reflect the RF signal. A distributed screen of reflective or absorptive ink of varying density enables individual or group fine tuning of an attenuation effect that regulates the read range of a RFID tag or label.

DETAILED DESCRIPTION

A RFID device with a surface treatment which interferes with the transmission of RF signals. Suitable surface treatments may either absorb and/or reflect RF signals.

Use of the attenuation patterns enables the fine-tuning of read ranges thereby eliminating or reducing the occurrence of accidental or cross reads between nearby RF interrogator/readers.

An RF interfering or absorbing surface treatment for a RFID device may be applied by hot stamping, printed inks using flexography, printed inks using rotogravure, ink deposition through the use of thermal transfer printing technology, printed inks using lithography, printed inks using silk screen printing technology or other printing methods.

Inks may be reflective, for example, metallic or may be RF signal absorbing. An example of a RF absorbing substance is water-laden nylon plastic film. A further deposition method is ion deposition printing. The interfering layer may be deposited at the time of printing thereby fixing the attenuation at a known level. Alternatively, the interference layer may be applied in an on demand fashion using ink jet and/or thermal transfer printing. In an on demand scenario, the end user may modify the amount of ink or pattern density applied between each individual label. Thus, the attenuation level may be varied to an individual requirement.

Figure 1:
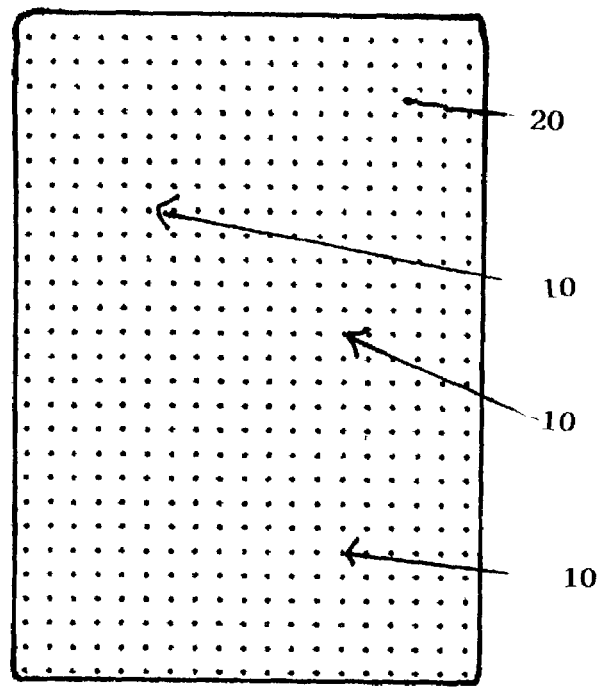
FIG. 1 is schematic representation of one embodiment of a label with surface treatment in dot screen form.
Figure 2:
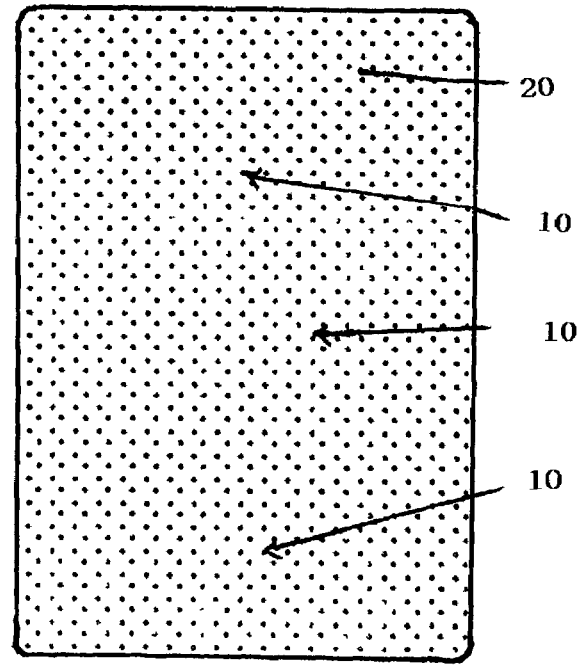
FIG. 2 is another example of the embodiment of FIG. 1 having a higher dot density.

As shown in FIG. 1, the pattern of deposition may be in a screen format, for example, pattern of dots 10 across surface 20 of the label. Alternatively, the pattern of deposition may be in a grid format. Adjusting the thickness or diameter of the grid or dots 20 adjusts the attenuation effect from the interference or reflective layer. FIG. 2 represents another embodiment of FIG. 1 having a higher density of dots 10 on surface 20 of the label thereby creating a higher attenuation and lowering the read range of the RFID label which this pattern is applied upon.

The following patents/documents are all hereby incorporated by reference:

U.S. Pat. No. 5,850,181 "Method Of Transporting Radio Frequency Power To Energize RFID Transponders".

U.S. Pat. No. 5,942,987 "Radio Frequency Identification System With Write Broadcast Capability".

International Publication Number WO 00/05674 "Communicating With Radio Frequency Identification Tags Within Shaped Electromagnetic Fields".

We claim:

1. A method for configuring the read range of an RFID device, comprising the steps of:

obtaining a RFID device;

selecting a pattern density prior to depositing the interfering layer;

depositing an interfering layer in an attenuation pattern upon said RFID device; and adjusting the attenuation level of the RFID device;

wherein said pattern is a plurality of spaced apart dots.

2. The method of claim 1, wherein said interfering layer is deposited by a printer using a print technology selected from the group consisting of hot stamping, flexography, rotogravure, thermal transfer printing, lithography silk screen printing, ion deposition printing, and ink jet printing.

3. The method of claim 1, wherein the interfering layer comprises a RF signal reflective ink.

4. The method of claim 1, wherein the interfering layer comprises RF signal absorptive ink.

5. The method of claim 1 wherein said RFID device is unprinted and said interfering layer is deposited at the time of printing said RFID device.

6. The method of claim 1 wherein said RFID device is preprinted and the interfering layer is deposited on the preprinted RFID device.

7. The method of claim 1 further comprising the step of selecting a pattern thickness prior to depositing the interfering layer.

8. The method of claim 1, wherein said RFID device is a label.

9. The method of claim 1, wherein said RFID device is a tag.

10. The method of claim 1 further comprising the step of selecting a pattern thickness prior to depositing the interfering layer.

11. The method of claim 1, wherein said pattern is a grid.

12. A read-range attenuated RFID device, comprising:
 a RFID device; and
 an interfering layer deposited in an attenuation pattern upon said RFID device; said
pattern having a pattern thickness and a pattern density;
 wherein said pattern is a plurality of spaced apart dots.

13. The read range attenuated RFID device of claim 12, wherein said interfering layer comprises RF signal reflective ink.

14. The read range attenuated RFID device of claim 13, wherein said RFID device is a RFID label.

15. The read range attenuated RFID device of claim 13, wherein said RFID device is a RFID tag.

16. The read range attenuated RFID device of claim 12, wherein said interfering layer comprises RF signal absorptive ink.

17. The read range attenuated RFID device of claim 16, wherein said RFID device is a RFID label.

18. The read range attenuated RFID device of claim 16, wherein said RFID device is a RFID tag.

19. The read range attenuated RFID device of claim 12, wherein said RFID device is a RFID label.

20. The read range attenuated RFID device of claim 12, wherein said RFID device is a RFID tag.

21. The read range attenuated RFID device of claim 12, wherein said pattern is a grid.

* * * * *